United States Patent
Hosokawa et al.

(10) Patent No.: US 10,056,623 B2
(45) Date of Patent: Aug. 21, 2018

(54) EXPANDED GRAPHITE SHEET AND BATTERY USING THE EXPANDED GRAPHITE SHEET

(71) Applicant: TOYO TANSO CO., LTD., Osaka-shi, Osaka (JP)

(72) Inventors: Toshihiro Hosokawa, Mitoyo (JP); Nobuya Misaki, Mitoyo (JP)

(73) Assignee: TOYO TANSO CO., LTD., Osaka (JP)

( * ) Notice: Subject to any disclaimer, the term of this patent is extended or adjusted under 35 U.S.C. 154(b) by 0 days.

(21) Appl. No.: 15/519,025

(22) PCT Filed: Nov. 25, 2015

(86) PCT No.: PCT/JP2015/083126
§ 371 (c)(1),
(2) Date: Apr. 13, 2017

(87) PCT Pub. No.: WO2016/084864
PCT Pub. Date: Jun. 2, 2016

(65) Prior Publication Data
US 2017/0237080 A1    Aug. 17, 2017

(30) Foreign Application Priority Data
Nov. 25, 2014    (JP) ................. 2014-237359

(51) Int. Cl.
*H01B 1/06* (2006.01)
*H01M 4/96* (2006.01)
(Continued)

(52) U.S. Cl.
CPC ........... *H01M 4/96* (2013.01); *C01B 31/0423* (2013.01); *H01M 12/08* (2013.01); *C01P 2006/40* (2013.01); *H01M 2004/8689* (2013.01)

(58) Field of Classification Search
CPC ................................... C08K 3/04; C09K 3/10
(Continued)

(56) References Cited

U.S. PATENT DOCUMENTS

2008/0149363 A1    6/2008  Han et al.
2008/0279710 A1    11/2008 Zhamu et al.
(Continued)

FOREIGN PATENT DOCUMENTS

EP    1139470 A1    10/2001
JP    61-32358 A    2/1986
(Continued)

OTHER PUBLICATIONS

Yoda et al., "Bocho Kokuen Sheet o Seikyoku to suru Kuki Kinzoku Denchi no Kento", the 40th Abstracts of Annual meeting of the Carbon Society of Japan, pp. 52, Dec. 3, 2013. (3 pages).
(Continued)

*Primary Examiner* — Khanh Tuan Nguyen
(74) *Attorney, Agent, or Firm* — Westerman, Hattori, Daniels & Adrian, LLP

(57) ABSTRACT

An expanded graphite sheet and a battery using the expanded graphite sheet are provided, that can inhibit the expanded graphite sheet from swelling even when the expanded graphite sheet is used for, for example, a positive electrode for an air battery.
An expanded graphite sheet includes an expanded graphite and has a surface water contact angle of greater than or equal to 90 degrees and a surface resistivity of less than or equal to 70 mΩ/sq. It is desirable that a polyolefin resin be contained in the expanded graphite sheet in a dispersed state. It is desirable that the polyolefin resin be polypropylene.

15 Claims, 4 Drawing Sheets

(51) Int. Cl.
  *C01B 31/04* (2006.01)
  *H01M 12/08* (2006.01)
  *H01M 4/86* (2006.01)

(58) Field of Classification Search
  USPC .................. 252/511; 419/66, 68; 428/323
  See application file for complete search history.

(56) References Cited

U.S. PATENT DOCUMENTS

| | | |
|---|---|---|
| 2011/0269056 A1 | 11/2011 | Mizuno |
| 2013/0032278 A1 | 2/2013 | Ottinger et al. |
| 2013/0040194 A1 | 2/2013 | Ottinger et al. |
| 2016/0301086 A1 | 10/2016 | Okano et al. |

FOREIGN PATENT DOCUMENTS

| | | | | |
|---|---|---|---|---|
| JP | 10-189006 A | | 7/1998 | |
| JP | 2000-195568 A | | 7/2000 | |
| JP | 2010-513685 | * | 4/2010 | ............... C08K 3/04 |
| JP | 2010-513685 A | | 4/2010 | |
| JP | 2011-042769 | * | 3/2011 | ............... C09K 3/10 |
| JP | 2011-42769 A | | 3/2011 | |
| JP | 2013-516374 A | | 5/2013 | |
| JP | 2013-527964 A | | 7/2013 | |
| WO | 2010/084614 A1 | | 7/2010 | |
| WO | 2015/076402 A1 | | 5/2015 | |

OTHER PUBLICATIONS

International Search Report dated Dec. 22, 2015, issued in counterpart International Application No. PCT/JP2015/083126 (2 pages).

Extended (supplementary) European Search Report dated Jun. 18, 2018, issued in counterpart European Application No. 15863771.0. (7 pages).

* cited by examiner

EXPANDED GRAPHITE SHEET AND BATTERY USING THE EXPANDED GRAPHITE SHEET

TECHNICAL FIELD

The present invention relates to an expanded graphite sheet and a battery using the expanded graphite sheet.

BACKGROUND ART

Air batteries are capable of containing a higher proportion of the negative electrode active material in the battery case, in comparison with such as lithium secondary batteries. Therefore, they are capable of obtaining a higher discharge capacity, which means that size reduction and weight reduction of the batteries are easier. Moreover, the air batteries have a low environmental impact because they use oxygen as the positive electrode active material, which is free from constraints on resource availability and also is a clean material. For these reasons, it is expected that the air batteries will be widely used for such as batteries for electric vehicles, batteries for hybrid vehicles, and batteries for fuel cell vehicles.

Here, it is required that the positive electrode for the air battery have electrical conductivity, chemical stability, and capability of supplying oxygen-originating hydroxide ions. In view of this, a positive electrode for an air battery that has a catalyst layer formed by adding activated carbon and a catalyst to Teflon (registered trademark) powder (Patent Literature 1) and a positive electrode for an air battery that uses a carbon material that permeates gas but does not permeate liquid (Patent Literature 2) have been disclosed.

In the conventional positive electrode for an air battery as described in Patent Literature 1 above, the carbonaceous component existing on the surface has a small surface area, so the supply of hydroxide ions is inhibited by the components other than the carbonaceous component. In addition, the conventional positive electrodes for an air battery as disclosed in Patent Literatures 1 and 2 need to have communicating pores for passing oxygen gas along a thickness direction of the positive electrode, in order to supply oxygen that is necessary for supplying hydroxide ions. However, the communicating pores cause a greater amount of the electrolyte solution to evaporate therethrough, and consequently, the amount of the electrolyte solution decreases. This results in the problems such as the deterioration in battery output power. Another problem has been that, because the HOPG used in Patent Literature 2 above is a costly material, the manufacturing cost of the battery is higher.

In order to solve the foregoing problems, an expanded graphite sheet is expected to be used as the positive electrode for an air battery.

CITATION LIST

Patent Literature

[Patent Literature 1] Japanese Published Unexamined Patent Application No. H10-189006
[Patent Literature 2] WO 2010/084614

SUMMARY OF INVENTION

Technical Problem

However, the following problem arises when an ordinary expanded graphite sheet is used as the positive electrode for an air battery. Specifically, the problem is that, when a water-based electrolyte solution is used as the electrolyte solution, the expanded graphite sheet may swell in some cases. Thus, there is room for improvement.

In view of the foregoing, it is an object of the present invention to provide an expanded graphite sheet and a battery using the expanded graphite sheet that can inhibit the expanded graphite sheet from swelling even when the expanded graphite sheet is used for such an application in which the expanded graphite sheet makes contact with liquid, such as a positive electrode for an air battery.

Solution to Problem

In order to accomplish the foregoing object, the present invention provides an expanded graphite sheet characterized by comprising an expanded graphite, and having a surface water contact angle of greater than or equal to 90° and a surface resistivity of less than or equal to 70 m$\Omega$/sq.

Advantageous Effects of Invention

The present invention achieves such a significant advantageous effect of inhibiting the expanded graphite sheet from swelling even when used for an application, such as a positive electrode for an air battery, in which the expanded graphite sheet makes contact with liquid.

DESCRIPTION OF EMBODIMENTS

Figure 1:
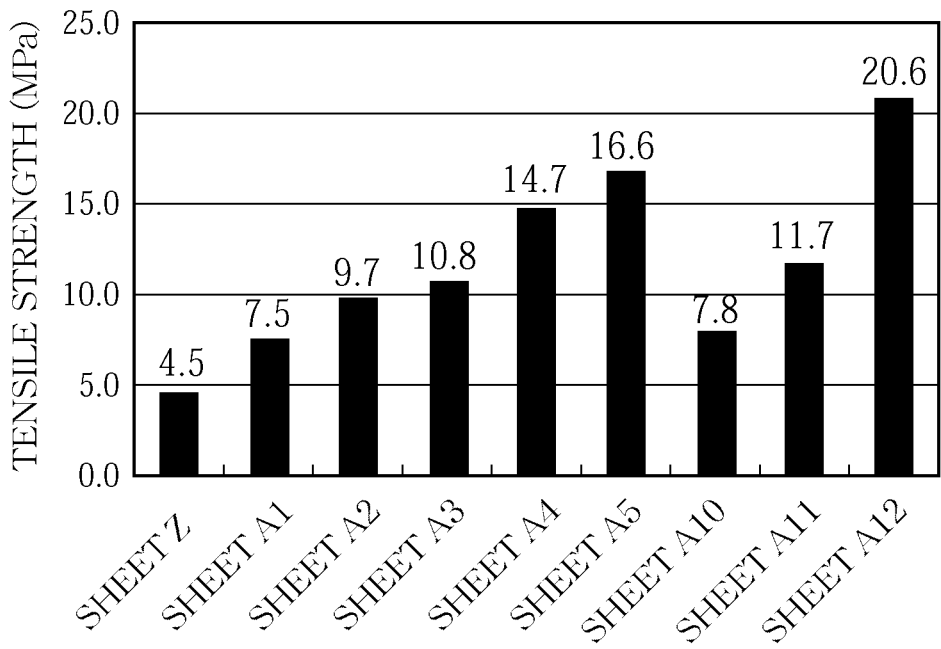
FIG. 1 is a graph showing the tensile strength of each of sheets A1 to A5, A10 to A12, and Z.

An expanded graphite sheet according to an embodiment of the present invention is characterized by comprising an expanded graphite and having a surface water contact angle of greater than or equal to 90° and a surface resistivity of less than or equal to 70 m$\Omega$/sq.

When the surface water contact angle is greater than or equal to 90°, the expanded graphite sheet shows excellent water repellency (i.e., the expanded graphite sheet shows low wettability). Accordingly, even when the expanded graphite sheet is exposed to water, an aqueous electrolyte solution, etc. (hereinafter referred to as "water, etc."), it is possible to prevent water, etc. from entering the inside of the expanded graphite sheet. As a result, it is possible to inhibit the expanded graphite sheet from swelling.

It is desirable that the expanded graphite sheet contain a polyolefin resin in a dispersed state.

The polyolefin resin is excellent in water repellency. For this reason, when the polyolefin resin exists in the expanded graphite sheet, the above-described advantageous effects can be sufficiently obtained. Moreover, when the polyolefin resin exists in a dispersed state, the expanded graphite, in addition to the polyolefin resin, exists on the surface of the expanded graphite sheet and within the expanded graphite sheet. This makes it possible to inhibit the decrease of the electrical conductivity of the expanded graphite sheet that originates from the presence of the polyolefin resin.

The expanded graphite sheet may be characterized by comprising an expanded graphite and a polyolefin resin, and having a surface resistivity of less than or equal to 70 mΩ/sq. It is desirable that the polyolefin resin be contained in a dispersed state.

Such a configuration makes it possible to obtain the same advantageous effects as described above.

It is desirable that the surface water contact angle be greater than or equal to 90°.

The reason is the same as described above.

It is desirable that the polyolefin resin be polypropylene.

When melted, polypropylene shows a low viscosity. This means that polypropylene can be dispersed very uniformly when the material is heat-treated after having been mixed with expanded graphite. As a result, polypropylene is dispersed highly uniformly in the expanded graphite sheet.

It is desirable that the polyolefin resin be contained in an amount of from 3 parts by weight to 20 parts by weight with respect to 100 parts by weight of the expanded graphite.

If the proportion of the polyolefin resin is less than 3 parts by weight with respect to 100 parts by weight of the expanded graphite, the effect obtained by adding the polyolefin resin may not be exhibited sufficiently. On the other hand, if the proportion exceeds 20 parts by weight, the electrical conductivity of the expanded graphite sheet may decrease.

It is desirable that the gas permeability be less than or equal to $6.0 \times 10^{-5}$.

With the just-described configuration, when the expanded graphite sheet is used as the positive electrode for an air battery, it takes a long time for an oxygen gas to pass through the expanded graphite sheet. This enables the oxygen gas to make contact with graphite for a long time. As a result, it is expected that the capacity of the air battery increases.

A positive electrode for an air battery, characterized by comprising one of the above-described expanded graphite sheets.

Also, a battery, characterized in that one of the above-described expanded graphite is used as an electrode.

When any one of the above-described expanded graphite sheets is used as a positive electrode for an air battery, the following advantageous effects are obtained. Specifically, when a water-based electrolyte solution is used as the electrolyte solution, the expanded graphite sheet is inhibited from swelling. As a result, breakage of the electrode is inhibited. Accordingly, the reliability of the air battery is improved, and also, the service life of the air battery can be prolonged. In addition, when polyolefin exists in the communicating pores in the expanded graphite, the polyolefin serves to narrow the passage of the oxygen gas, causing the oxygen gas to take a long time to pass therethrough. As a result, it is expected that the capacity of the air battery increases, as mentioned above.

It should be noted that if the amount of the polyolefin is too large, there is a risk that a voltage decrease may be incurred because the surface resistance increases, or there is a risk that a decrease in the battery capacity may be incurred because oxygen cannot be supplied. Taking such risks into consideration, it is desirable that the proportion of the polyolefin resin be less than or equal to 20 parts by weight with respect to 100 parts by weight of the expanded graphite.

EXAMPLES

Example 1

First, an acid treatment solution was prepared by adding 5 parts by weight of hydrogen peroxide as an oxidizing agent to 100 parts by weight of strong sulfuric acid with a concentration of 98%, and natural graphite having an ash content of 0.01 weight % or lower was immersed and stirred in the acid treatment solution for 30 minutes to cause a reaction, to thereby obtain an acid treated graphite. Next, the resultant acid treated graphite was removed from the acid treatment solution, thereafter washed with water sufficiently to bring the pH closer to 7, and further dried.

Next, the acid treated graphite having been washed with water was put into an electric furnace at a temperature of 1000° C. for 30 seconds to carry out a heating and expanding process. Thereby, an expanded graphite having a particle size of 30 to 100 mesh was prepared.

Thereafter, 7.2 g of the just-described expanded graphite was mixed with 0.36 g of polypropylene [LMS-30 (average particle size of 5 μm), melting point 163° C., made by Seishin Enterprise Co., Ltd.] (that is, the proportion of the polypropylene was set to 5 parts by weight with respect to 100 parts by weight of the expanded graphite). Next, preforming was carried out, thereafter the preformed material was made into a sheet so as to obtain a bulk density of 1.0 Mg/cm$^3$, and a heat treatment was further carried out, whereby an expanded graphite sheet was prepared. The conditions of the heat treatment were as follows: after the material put into an electric furnace at 100° C., the temperature was elevated to 160° C. and kept at 160° C. for 10 minutes. The thickness of this expanded graphite sheet was 0.48 mm.

The expanded graphite sheet prepared in this manner is hereinafter referred to as a sheet A1.

Example 2

An expanded graphite sheet was prepared in the same manner as described in Example 1 above, except that the amount of the polypropylene added was set to 0.72 g (in other words, the proportion of the polypropylene was set to 10 parts by weight with respect to 100 parts by weight of the expanded graphite). The thickness of this expanded graphite sheet was 0.5 mm.

The expanded graphite sheet prepared in this manner is hereinafter referred to as a sheet A2.

Example 3

An expanded graphite sheet was prepared in the same manner as described in Example 1 above, except that the amount of the polypropylene added was set to 1.08 g (in other words, the proportion of the polypropylene was set to 15 parts by weight with respect to 100 parts by weight of the expanded graphite). The thickness of this expanded graphite was 0.5 mm.

The expanded graphite sheet prepared in this manner is hereinafter referred to as a sheet A3.

Example 4

An expanded graphite sheet was prepared in the same manner as described in Example 1 above, except that the bulk density was set to 1.36 Mg/cm$^3$ by increasing the pressure at the time of making the material into a sheet. The thickness of this expanded graphite sheet was 0.35 mm.

The expanded graphite sheet prepared in this manner is hereinafter referred to as a sheet A4.

Example 5

An expanded graphite sheet was prepared in the same manner as described in Example 1 above, except that the bulk density was set to 1.68 Mg/cm$^3$ by increasing the pressure at the time of making the material into a sheet. The thickness of this expanded graphite sheet was 0.29 mm.

The expanded graphite sheet prepared in this manner is hereinafter referred to as a sheet A5.

Example 6

An expanded graphite sheet was prepared in the same manner as described in Example 1 above, except that the bulk density was set to 2.00 Mg/cm$^3$ by increasing the pressure at the time of making the material into a sheet. The thickness of this expanded graphite sheet was 0.23 mm.

The expanded graphite sheet prepared in this manner is hereinafter referred to as a sheet A6.

Example 7

An expanded graphite sheet was prepared in the same manner as described in Example 3 above, except that 1.08 g of the polypropylene was dispersed in 40 mL of ethanol, then sprayed uniformly onto 7.2 g of the expanded graphite, and air dried, to obtain a mixture of the expanded graphite and the polypropylene. The thickness of this expanded graphite sheet was 0.5 mm.

The expanded graphite sheet prepared in this manner is hereinafter referred to as a sheet A7.

Example 8

An expanded graphite sheet was prepared in the same manner as described in Example 1 above, except that the amount of the expanded graphite was set to 15.2 g and the amount of the polypropylene added was set to 3.05 g (in other words, the proportion of the polypropylene was set to 20 parts by weight with respect to 100 parts by weight of the expanded graphite). The thickness of this expanded graphite sheet was 0.5 mm.

The expanded graphite sheet prepared in this manner is hereinafter referred to as a sheet A8.

Example 9

An expanded graphite sheet was prepared in the same manner as described in Example 1 above, except that the amount of the expanded graphite was set to 15.2 g and the amount of the polypropylene added was set to 3.77 g (in other words, the proportion of the polypropylene was set to 25 parts by weight with respect to 100 parts by weight of the expanded graphite). The thickness of this expanded graphite sheet was 0.5 mm.

The expanded graphite sheet prepared in this manner is hereinafter referred to as a sheet A9.

Example 10

An expanded graphite sheet was prepared in the same manner as described in Example 1 above, except that 1.53 g of the polypropylene was dispersed in 40 mL of ethanol, then sprayed uniformly onto 15.2 g of the expanded graphite, and air dried, to obtain a mixture of the expanded graphite and the polypropylene (in other words, the proportion of the polypropylene was set to 10 parts by weight with respect to 100 parts by weight of the expanded graphite). The thickness of this expanded graphite sheet was 0.5 mm.

The expanded graphite sheet prepared in this manner is hereinafter referred to as a sheet A10.

Example 11

An expanded graphite sheet was prepared in the same manner as described in Example 1 above, except that 1.52 g of the polypropylene was dispersed in 40 mL of ethanol, then sprayed uniformly onto 15.2 g of the expanded graphite, and air dried, to obtain a mixture of the expanded graphite and the polypropylene (in other words, the proportion of the polypropylene was set to 10 parts by weight with respect to 100 parts by weight of the expanded graphite), and also that the bulk density was set to 1.30 Mg/m$^3$ by increasing the pressure at the time of making the material into a sheet. The thickness of this expanded graphite sheet was 0.38 mm.

The expanded graphite sheet prepared in this manner is hereinafter referred to as a sheet A11.

Example 12

An expanded graphite sheet was prepared in the same manner as described in Example 1 above, except that 1.54 g of the polypropylene was dispersed in 40 mL of ethanol, then sprayed uniformly onto 15.2 g of the expanded graphite, and air dried, to obtain a mixture of the expanded graphite and the polypropylene (in other words, the proportion of the polypropylene was set to 10 parts by weight with respect to 100 parts by weight of the expanded graphite), and also that the bulk density was set to 1.60 Mg/m$^3$ by increasing the pressure at the time of making the material into a sheet. The thickness of this expanded graphite sheet was 0.31 mm.

The expanded graphite sheet prepared in this manner is hereinafter referred to as a sheet A12.

Comparative Example

An expanded graphite sheet was prepared in the same manner as described in Example 1 above, except that no polypropylene was added to the expanded graphite. The thickness of this expanded graphite sheet was 0.5 mm.

The expanded graphite sheet prepared in this manner is hereinafter referred to as a sheet Z.

Experiment

The tensile strength, the surface resistivity, and the contact angle of each of the sheets A1, A2, A4, and A5 described above were determined under the following conditions. Also, the tensile strength, the surface resistivity, the contact angle, and the gas permeability of each of the sheets A3 and Z described above were determined under the following conditions. Further, the surface resistivity and the contact angle of each of the sheets A6 and A7 described above were determined under the following conditions. In addition, the surface resistivity and the gas permeability of each of the sheets A8 and A9 described above were determined under the following conditions. Also, the tensile strength, the surface resistivity, and the gas permeability of each of the sheets A10 to A12 described above were determined under the following conditions. The results of the experiments for the sheets A1 to A12 and Z are shown in Table 1 below. The tensile strength, the surface resistivity, and the gas permeability are shown also in FIGS. 1 to 3.

[Tensile Strength]

The measurement was carried out in the same manner as described in JIS R7222 "Method of measuring tensile strength". The equipment used for the measurement was an Autograph universal tester.

[Surface Resistivity]

The measurement was carried out based on a four terminal sensing method. The equipment used for the measurement was a resistivity meter K-705RS made by Kyowa Riken Co., Ltd.

[Contact Angle]

The measurement was carried out by dropping 1 μL of water onto a surface of each of the sheets. The equipment used for the measurement was an automatic contact angle meter CA-VP (made by Kyowa Interface Science Co., Ltd.). Under an atmosphere at 20° C., 10 water drops, each drop containing 1 μL of water, were prepared for each one of the samples with a syringe, the contact angles of the drops were measured with the just-mentioned equipment, and the mean value of the measured contact angles was obtained. This operation was repeated 10 times, and the resulting mean value was defined as the measured value of the contact angle.

[Gas Permeability]

Figure 4:
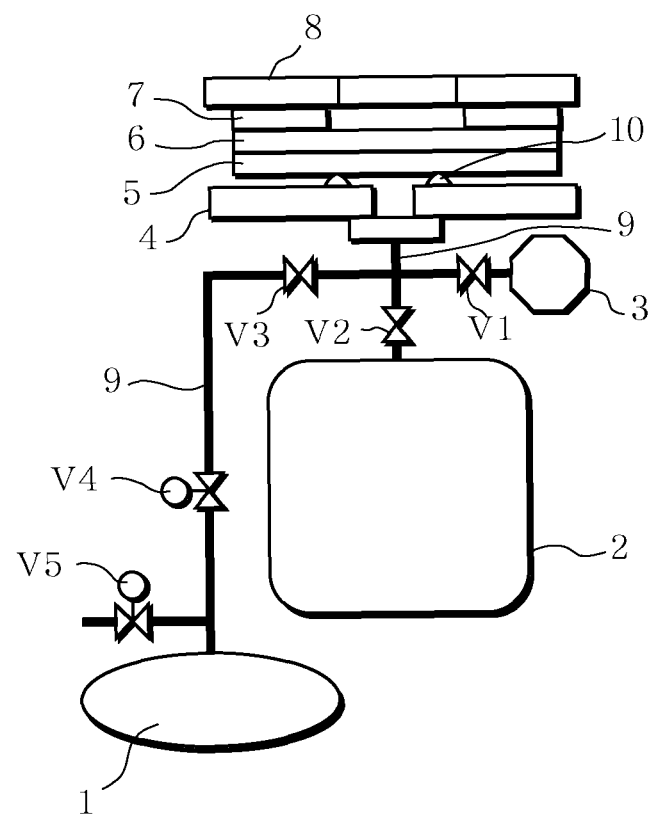
FIG. 4 is an illustrative view showing a gas permeability measuring device.

The measurement of the gas permeability was carried out using a gas permeability measuring device as shown in FIG. 4.

Figure 5:
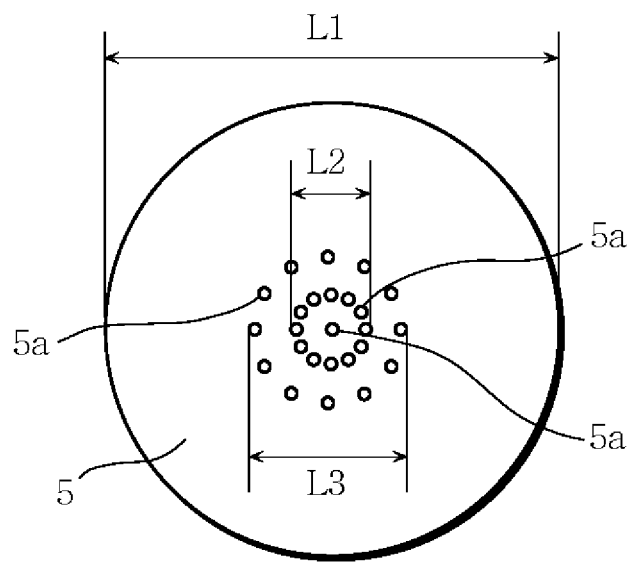
FIG. 5 is a top view of a sample mounting plate.
Figure 6:
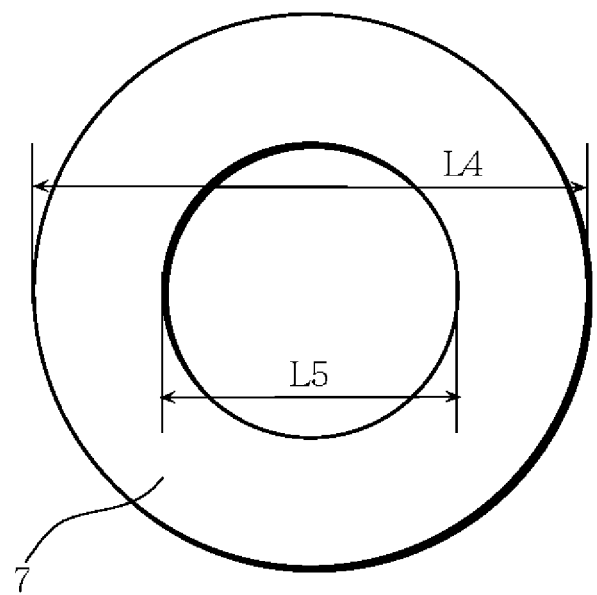
FIG. 6 is a top view of a rubber packing.
Figure 7:
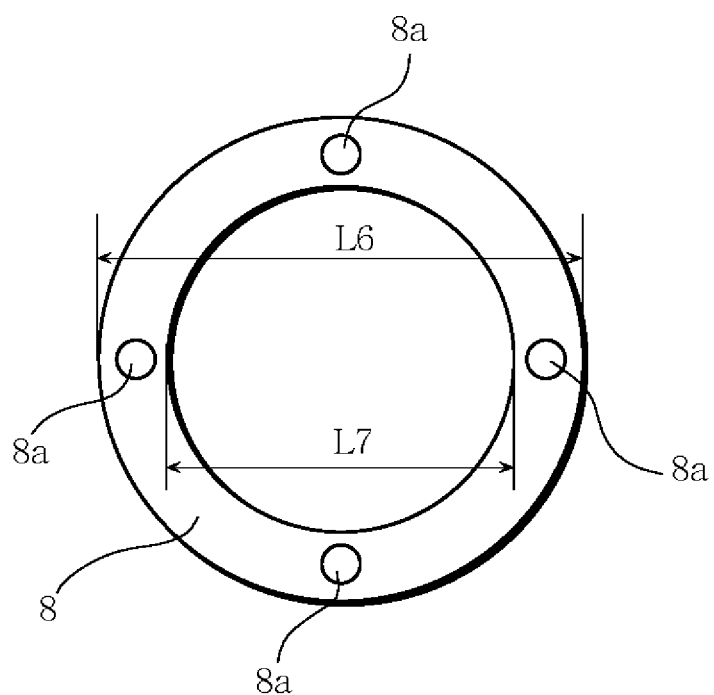
FIG. 7 is a top view of a metal flange.

As illustrated in FIG. 4, a sample mounting plate 5, a sample 6, and a rubber packing 7 are placed in that order on an O-ring 10 disposed on a pedestal 4. A metal flange 8 disposed on the rubber packing 7 is screw-fastened to the pedestal 4 with bolts. 25 through-holes 5a each having a diameter of 1 mm are formed in the sample mounting plate 5, as illustrated in FIG. 5. The rubber packing 7 is formed in a doughnut-like shape, as illustrated in FIG. 6. The metal flange 8 is also formed in a doughnut-like shape, as illustrated in FIG. 7. Reference symbol 8a represents a through-hole for passing a bolt therethrough. In FIGS. 5 to 7, L1 is set to 78 mm, L2 is 15 mm, L3 is 30 mm, L4 is 80 mm, L5 is 48 mm, L6 is 110 mm, and L7 is 63 mm.

A vacuum pump 1, a measurement tank 2, and a manometer (vacuum gauge) 3 are connected to the bottom of the pedestal 4 via a pipe line 9. Reference symbols V1 to V5 represent valves.

Using the just-described gas permeability measuring device, the gas permeability was measured in the following manner.

(1) The vacuum pump 1 is started while the valves V1 and V4 are opened and the valves V2, V3, and V5 are closed.

(2) The valves V2, and V3 are opened.

(3) After the pressure of the measurement tank 2 has reached 190 Pa, the valve 3 is closed.

(4) The numerical value shown by the manometer 3 is obtained (the measurement value obtained at this time is employed as $P_1$).

(5) At 30 minutes after the valve V3 has been closed in the foregoing (3), the numerical value shown by the manometer 3 is obtained (the measurement value obtained at this time is employed as $P_2$).

(6) The gas permeability is calculated according to the following equation.

$$\text{Gas permeability (cm}^2/\text{s}) = \\ (\text{Amount of permeated gas}) \times (\text{Thickness})/(\text{Permeation area}) \times \\ (\text{Time}) \times (\text{Pressure difference}) = (V \cdot \Delta p) \cdot t / A \cdot T \cdot (P_0 - P_2)$$

In the above equation:

$\Delta p = P_2 - P_1$, $P_0$: atmospheric pressure (before the measurement, typical value: 101,325 Pa), V: volume of the measurement tank (11,050 cm$^3$), A: permeation area □ 2 cm (3.14 cm$^2$), T: measurement time (30×60 sec.), and t: thickness of the sample (cm).

TABLE 1

| Sheet | Amount of expanded graphite (g) | Amount of PP (g) | Proportion of PP (parts by weight) | Total amount (g) | Bulk density (Mg/m$^3$) | Tensile strength (MPa) | Surface resistivity (mΩ/sq) | Contact angle (degree) | Gas permeability (cm$^2$/s) |
|---|---|---|---|---|---|---|---|---|---|
| A1 | 7.2 | 0.36 | 5 | 7.6 | 1.00 | 7.5 | 57.3 | 98.0 | — |
| A2 | | 0.72 | 10 | 7.9 | 1.00 | 9.7 | 58.4 | 102.7 | — |
| A3 | | 1.08 | 15 | 8.3 | 1.00 | 10.8 | 59.2 | 105.1 | 1.41 × 10$^{-5}$ |
| A4 | | 0.36 | 5 | 7.6 | 1.36 | 14.7 | 58.7 | 95.0 | — |
| A5 | | 0.36 | 5 | 7.6 | 1.68 | 16.6 | 55.6 | 93.6 | — |
| A6 | | 0.36 | 5 | 7.6 | 2.00 | — | 48.3 | 94.0 | — |
| A7 | | 1.08 | 15 | 8.3 | 1.00 | — | 64.4 | 107.6 | — |
| A8 | 15.2 | 3.05 | 20 | 18.3 | 1.00 | — | 67.6 | — | 8.32 × 10$^{-6}$ |
| A9 | | 3.77 | 25 | 19.0 | 1.00 | — | 67.4 | — | 7.25 × 10$^{-6}$ |
| A10 | | 1.53 | 10 | 16.7 | 1.00 | 7.8 | 62.9 | — | 8.00 × 10$^{-6}$ |
| A11 | | 1.52 | 10 | 16.7 | 1.30 | 11.7 | 58.8 | — | 7.50 × 10$^{-6}$ |
| A12 | | 1.54 | 10 | 16.7 | 1.60 | 20.6 | 54.5 | — | 3.50 × 10$^{-6}$ |
| Z | 7.2 | 0 | 0 | 7.2 | 1.00 | 4.5 | 49.5 | 72.0 | 7.74 × 10$^{-5}$ |

\* The proportion of PP means the proportion of PP with respect to 100 parts by weight of expanded graphite.
\*\* Total amount means the total of the amount of expanded graphite and the amount of PP.

As clearly seen from Table 1 above and FIG. 1, it is observed that each of the sheets A1 to A5 and A10 to A12 exhibits a higher tensile strength than the sheet Z. When the sheets A1 to A3 are compared, the tensile strength is greater in the order of the sheet A1, the sheet A2, and the sheet A3. Thus, it is indicated that the higher the proportion of the polypropylene is, the greater the tensile strength will be. Moreover, when the sheets A1, A4, A5, and A6 are compared, the tensile strength is greater in the order of the sheet A1, the sheet A4, the sheet A5, and the sheet A6. When the sheets A10 to A12 are compared, the tensile strength is greater in the order of the sheet A10, the sheet A11, and the sheet A12. Thus, it is indicated that the higher the bulk density of the expanded graphite sheet is, the greater the tensile strength will be.

As clearly seen from Table 1 above, it is observed that each, of the sheets A1 to A7 exhibits a greater contact angle than the sheet Z. When the sheets A1 to A3 are compared, the contact angle is greater in the order of the sheet A1, the sheet A2, and the sheet A3. Thus, it is indicated that the higher the proportion of the polypropylene is, the greater the contact angle will be. Furthermore when the sheets A1 and A4 to A6 are compared, no significant difference was observed between the sheets. Thus, it is indicated that the bulk density of the expanded graphite sheet does not significantly affect the contact angle.

Figure 2:
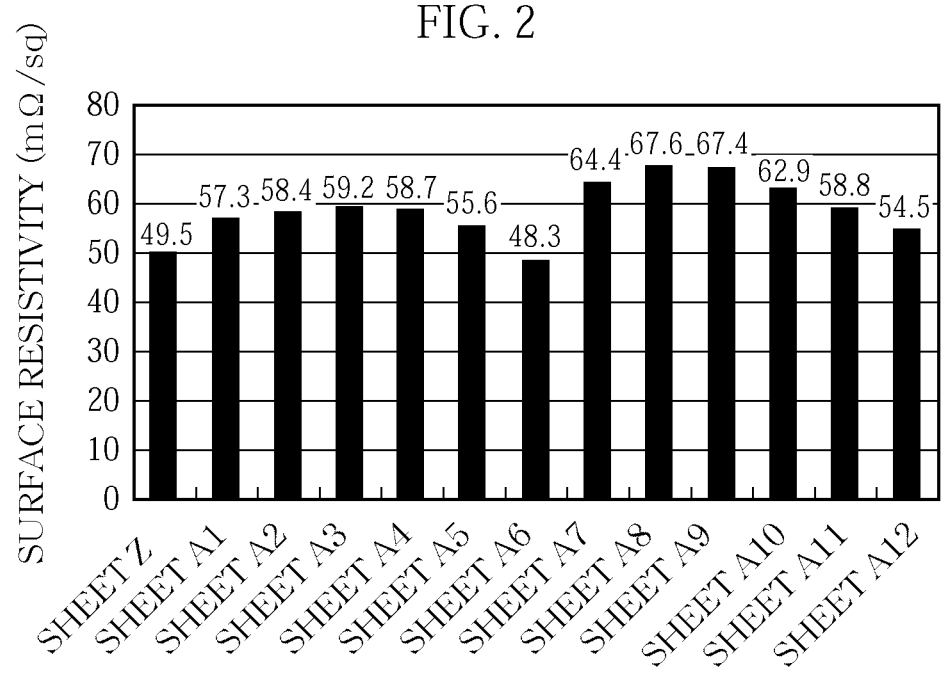
FIG. 2 is a graph showing the surface resistivity of each of sheets A1 to A12 and Z.

As clearly seen from Table 1 above and FIG. 2, it is observed that although each of the sheets A1 to A5 and A7 to AU shows a slightly higher surface resistivity than the sheet Z, the increase of the surface resistivity is at a level that it causes no practical problem. Also, the sheet A6 shows a lower surface resistivity than the sheet Z. Furthermore, when the sheet A1 to A3 are compared, no significant difference was observed between the sheets. Thus, it is indicated that the proportion of the polypropylene does not significantly affect the surface resistivity when the proportion of the polypropylene is low (when the proportion of the polyolefin resin is about 15 parts by weight or less with respect to 100 parts by weight of the expanded graphite). However, when the sheets A1 to A3 are compared with the sheets A8 and A9, it is observed that each of the sheets A8 and A9 shows a higher surface resistivity than the sheets A1 to A3. Thus, it is indicated that the surface resistivity slightly increases when the proportion of the polypropylene is high (when the proportion of the polyolefin resin is about 20 parts by weight or greater with respect to 100 parts by weight of the expanded graphite). Moreover, when the sheets A4 to A6 are compared, the surface resistivity is lower in the order of the sheet A4, the sheet A5, and the sheet A6. When the sheets A10 to A12 are compared, the surface resistivity is lower in the order of the sheet A10, the sheet A11, and the sheet A12. Thus, it is indicated that the higher the bulk density of the expanded graphite sheet is, the lower the surface resistivity will be.

In addition, although the sheets A3 and A7 contains the same amount of polypropylene, the surface resistivity and the contact angle are higher in the sheet A7. The reason is believed to be that, in the sheet A7, the polypropylene was arranged more uniformly around the expanded graphite particles because the polypropylene was uniformly dispersed in the solvent and sprayed to prepare the mixture.

As demonstrated b the sheets A1 to A12, the surface resistivity is kept to less than or equal to 70 mΩ/sq. It is preferable that the surface resistivity be set to less than or equal to 65 mΩ/sq, or more preferably kept to less than or equal to 60 mΩ/sq.

Figure 3:
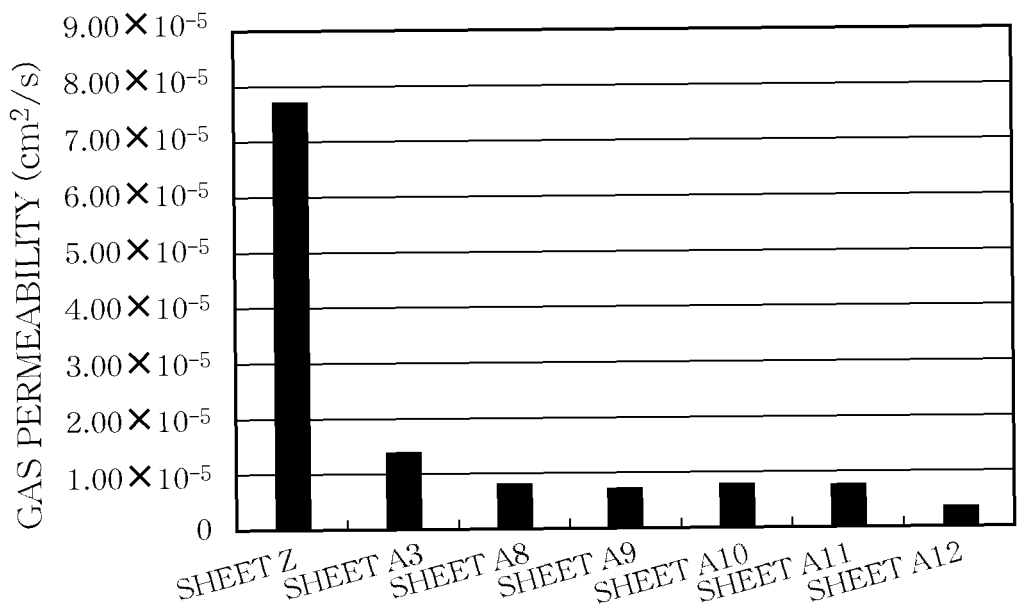
FIG. 3 is a graph showing the gas permeability of each of sheets A3, A8 to A12, and Z.

As clearly seen from Table 1 above and FIG. 3, it is observed that each of the sheets A3 and A8 to A12 exhibits a lower gas permeability than the sheet Z. Here, when the expanded graphite sheet is used as a positive electrode for an air battery and the expanded graphite sheet has sufficiently low gas permeability, it takes a long time for the oxygen gas to pass through the expanded graphite sheet, and therefore, the oxygen gas and graphite can be in contact with each other for a long time. As a result, it is expected that the battery capacity increases.

In addition, when the sheets A3, A8, and A9 are compared, it is observed that the gas permeability is lower in the order of the sheet A3, the sheet A8, and the sheet A9. Accordingly, it is demonstrated that the greater the proportion of polypropylene is, the lower the gas permeability will be. In addition, when the sheets A10 to A12 are compared, the gas permeability is lower in the order of the sheet A10, the sheet A11, and the sheet A12. Accordingly, it is demonstrated that the greater the bulk density is, the lower the gas permeability will be.

Other Embodiments (1) The graphite that is used as the raw material is not limited to natural graphite as described above, but may be pyrolytic graphite, kish graphite, and the like. However, it is preferable to use natural graphite flake, which is readily industrially available. However, whenever any type of graphite is used, it is preferable that the ash content be lower.

(2) The oxidizing agent is not limited to hydrogen peroxide as described above, but may be ammonium peroxide, potassium peroxide, and the like. In addition, the amount thereof to be added may be from 1 to 10 parts by weight with respect to 100 parts by weight of the sulfuric acid.

(3) The method for neutralizing the acid treated graphite is not limited to sufficient washing with water. It may be carried out by using a solid neutralizer agent selected from oxides of alkaline-earth metals, hydroxides, carbonates, and the like.

(4) It is preferable that the bulk density of the expanded graphite sheet be from 0.5 g/cm$^3$ to 1.8 g/cm$^3$ (more preferably from 0.7 g/cm$^3$ to 1.6 g/cm$^3$). When the expanded graphite sheet is used as an electrode for an air battery, it is preferable that the thickness of the expanded graphite sheet be from 0.02 mm to 1.5 mm.

(5) The expanded graphite may be mixed with a resin other than polypropylene, such as polyethylene terephthalate (PET), acrylonitrile butadiene styrene (ABS), polyvinylidene fluoride (PVDF), or polytetrafluoroethylene (PTFE). Taking dispersibility into consideration, it is preferable to use a resin that has a high MFR (melt flow rate) at or around its melting point.

(6) In addition, the polyolefin resin is not limited to polypropylene as described above, but may be other resin such as polyethylene.

INDUSTRIAL APPLICABILITY

The present invention is applicable to, for example, a positive electrode for an air battery.

The invention claimed is:

1. An expanded graphite sheet comprising an expanded graphite, and having a surface water contact angle of greater than or equal to 90° and a surface resistivity of less than or equal to 70 mΩ/sq.

2. The expanded graphite sheet according to claim 1, wherein the expanded graphite sheet contains a polyolefin resin in a dispersed state.

3. The expanded graphite sheet according to claim 2, wherein the polyolefin resin is polypropylene.

4. The expanded graphite sheet according to claim 2, wherein the polyolefin resin is contained in an amount of from 3 parts by weight to 20 parts by weight with respect to 100 parts by weight of the expanded graphite.

5. The expanded graphite sheet according to claim 1, having a gas permeability of less than or equal to $6.0 \times 10^{-5}$.

6. A positive electrode for an air battery, comprising an expanded graphite sheet according to claim 1.

7. A battery comprising an expanded graphite sheet according to claim 1 used as an electrode.

8. An expanded graphite sheet comprising an expanded graphite and a polyolefin resin, and having a surface resistivity of less than or equal to 70 mΩ/sq.

9. The expanded graphite sheet according to claim 8, wherein the polyolefin resin is contained in a dispersed state.

10. The expanded graphite sheet according to claim 8, having a surface water contact angle of greater than or equal to 90°.

11. The expanded graphite sheet according to claim 8, wherein the polyolefin resin is polypropylene.

12. The expanded graphite sheet according to claim 8, wherein the polyolefin resin is contained in an amount of from 3 parts by weight to 20 parts by weight with respect to 100 parts by weight of the expanded graphite.

13. The expanded graphite sheet according to claim 8, having a gas permeability of less than or equal to $6.0 \times 10^{-5}$.

14. A positive electrode for an air battery, comprising an expanded graphite sheet according to claim 8.

15. A battery comprising an expanded graphite sheet according to claim 8 used as an electrode.

* * * * *